United States Patent [19]
Plett

[11] Patent Number: 4,603,775
[45] Date of Patent: Aug. 5, 1986

[54] COUPLING GRAIN AUGERS

[75] Inventor: Benjamin Plett, Rosenort, Canada

[73] Assignee: Westfield Industries Ltd., Rosenort, Canada

[21] Appl. No.: 467,656

[22] Filed: Feb. 18, 1983

[51] Int. Cl.⁴ .............................................. B65G 33/32
[52] U.S. Cl. ..................... 198/589; 198/311; 198/313
[58] Field of Search ............... 198/306, 311, 313, 314, 198/320, 589, 593, 583, 584; 285/223, 265, 272, 164; 403/57, 74; 414/573, 300, 293

[56] References Cited
U.S. PATENT DOCUMENTS
1,114,425 10/1914 Adams ................................. 198/584
2,032,944 3/1936 Lower ................................. 198/589

OTHER PUBLICATIONS
Farm King Grain Augers.

Primary Examiner—Jeffrey V. Nase
Attorney, Agent, or Firm—Stanley G. Ade

[57] ABSTRACT

A coupling between two auger conveyor tubes is formed from three linkages providing rotation about fixed axes arranged mutually at right angles. The coupling is formed by a pair of coaxial rings coupled by pivot pins, a second pivot pin connection and a rotational sliding fit connection between a spout of the first auger and one of the sleeves or between an inlet opening of the second auger and one of the sleeves. The coupling arrangement allows the use with a main auger of a feed auger which can be pivoted relative to the inlet of the main auger to a storage position and to various working positions to accommodate varying ground conditions and varying positions of discharge of the material to be conveyed.

6 Claims, 5 Drawing Figures

COUPLING GRAIN AUGERS

BACKGROUND OF THE INVENTION

This invention relates to apparatus for conveying material and particularly new and useful improvements for obtaining flexible connections between rigid auger tube sections on portable grain auger assemblies.

Over the last several years new configurations of portable grain handling equipment have come into use which utilize more than one straight section of auger flighting and tubing. Such configurations have been developed due to features relating to unloading hopper bottom trailers, flexible auger hopper positioning and the use of farm tractors to position grain augers.

Since the relative positioning of the two auger sections connecting together may vary significantly from job to job, a flexible coupling mechanism which allows freedom of movement and yet facilitates smooth material flow from the outlet of one section to the inlet of another section is desirable.

Typically, a portable grain auger consists of a long piece of flighting within a round tubing section mounted on an adjustable undercarriage. The configuration is such that the tube sits at an incline with an opening at the top serving as an outlet and another opening at the bottom serving as an inlet. The mounting of the auger tubing to the undercarriage is constructed so that an adjustment to the undercarriage linkage allows the angle of inclination of the auger to be changed; thus making it possible to position the outlet at any desired height.

Another shorter section of auger flighting and tubing is often used in combination with this configuration is such a manner that the outlet of the short auger section feeds into the inlet for the long inclined auger tube. Tne inlet on the short auger is then normally fitted with a hopper to facilitate dumping into it from a truck or trailer. While the outlet of the short auger section remains fixed in position relative to the inlet of the long auger section, the inlet of the short auger can normally be swung from side to side and raised and lowered with respect to the outlet as required.

SUMMARY OF INVENTION

The present invention is designed to provide a more practical method of connecting the outlet of one tubing section to the inlet of another tubing section on portable grain auger systems which utilize more than one section of straight line flighting.

It is one advantage of the invention that the first conveying tube may comprise a first auger and the inlet tube inlet box of a second or main auger.

Accordingly the invention provides an apparatus for conveying material comprising a conveying tube having an outlet spout, an inlet having an opening into which said spout extends for discharging conveyed material and means for coupling said spout to said inlet comprising three coupling portions each arranged to allow pivotal movement about a respective one of three different axes and to maintain the axes fixed relative to each other.

One practical embodiment of a portable bin loading conveyor having these two auger sections uses the power-take-off of a farm tractor to power the main auger section and the hydraulic system of this same tractor to operate a hydraulic motor mounted at one end of the flighting shaft off the first or feed auger section. With this configuration the tractor is hitched to the inlet end of the main auger tube and a drive shaft is utilized to power the main auger flighting directly from the lower end. The feed auger section which feeds into the main auger is then positioned at right angles to the tractor and main auger assembly, so that the flow of grain changes direction between the two auger sections. Thus, the inlet hopper for truck unloading is placed well to one side of the main assembly.

This configuration allows the tractor to be utilized for positioning the grain auger and furthermore allows it to remain attached to the hitch point during the operation, at which time it is also used to power both sections of auger flighting.

In order to utilize the full capability of this type of system it is desirable to connect the two auger sections in such a manner that the feed auger section can be folded back for transport as well as positioned adequately for operation at any angle of inclination of the main auger, without causing any restriction in the grain flow between the two auger sections. In addition, it is desirable to have as much flexibility of movement in the operating position as possible so that the inlet hopper may be moved to more readily match the position of a vehicle dumping into this hopper.

According to one advantageous form of the invention, the outlet spout is pointed downward when it is in its normal operating position. The inlet end of the long auger section meanwhile is fitted with an enclosure that includes the opening at the top positioned directly above the open inlet flighting. Within this opening are positioned two concentric rings, each of which is free to rotate about one axis running through the center of the ring and parallel with the plane of the ring. The outer ring is constructed with two pins on its outer circumference which retains it within swivel points mounted on the intake enclosure. The inner ring, which fits inside the outer ring, is also constructed with two pins opposite each other on the outer circumference. These pins retain it within swivel points on the outer ring and allow rotation of the inside ring relative to the outside ring. By having the two axes of rotation for these rings at right angles to each other two degrees of freedom in rotation result.

The third degree of freedom in rotation is obtained by inserting the round outlet spout of the feed auger section inside the inner ring, mounted at the top of the enclosure of the main auger. Since the outlet spout is free to rotate within this ring a third degree of rotational freedom perpendicular to the inner ring results.

This connection therefore allows the short auger to be positioned at any desired angle relative to the main auger assembly; the only restriction being due to the physical construction of the complete assembly. The material being conveyed is dropped through the center of this swivel apparatus and into the top of the main auger inlet without restriction regardless of the position of the feed auger. Thus, the feed auger can also be swung to either side of the main auger assembly very easily to allow truck unloading from whatever position is most convenient. Furthermore, the feed auger section may be swung backward alongside the main auger tube and raised free of the ground very easily for transport, while still remaining fully connected.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DETAILED DESCRIPTION

Figure 1:
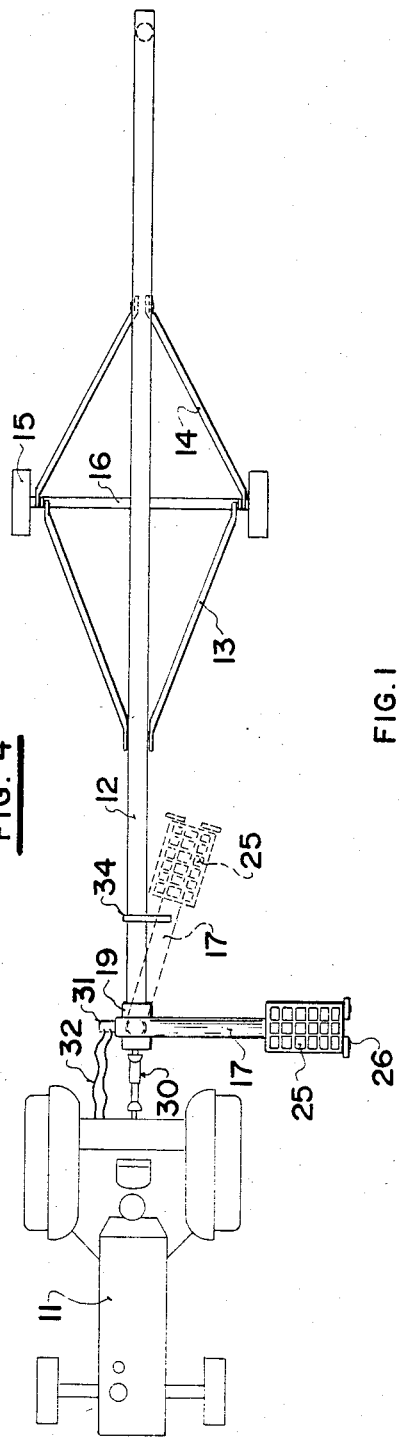
FIG. 1 is a plan view of a portable auger system which utilizes a main auger section and a feed auger section connected to a tractor and showing in full line the operating position and in phantom line the transport position.
Figure 2:
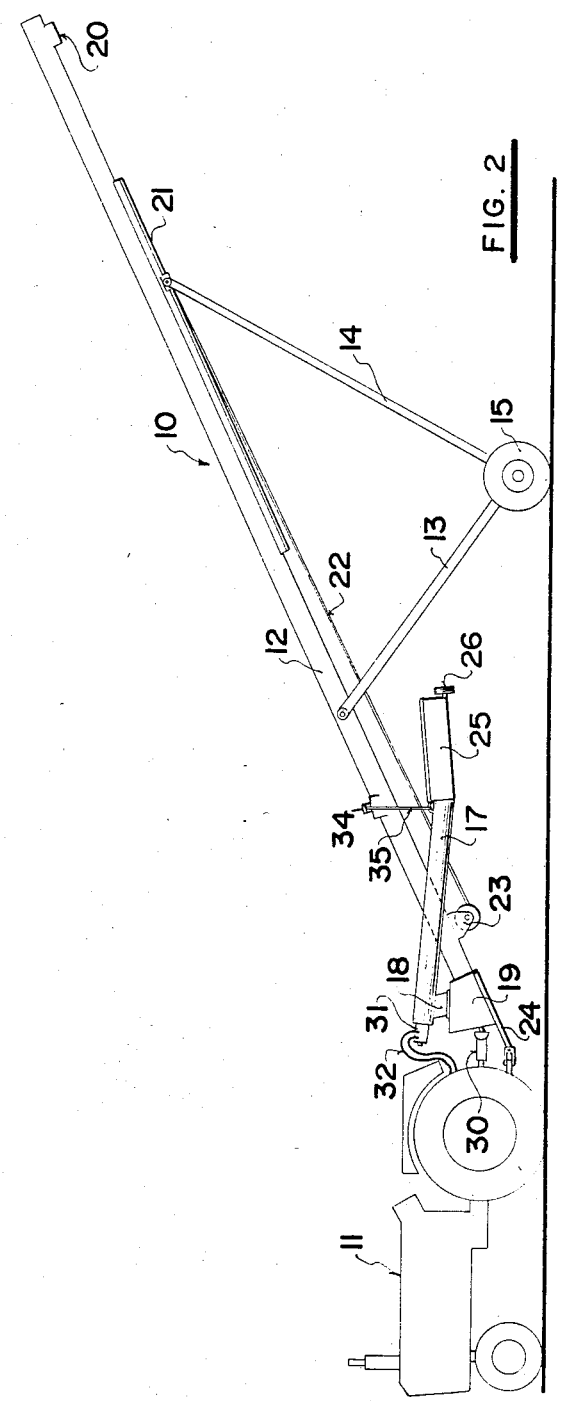
FIG. 2 is a side elevation of FIG. 1 showing only the transport position of the feed auger section.

FIGS. 1 and 2 illustrate the embodiment of a portable grain conveyor system in which two separate auger sections are utilized. This unit, collectively designated as 10, is shown attached to a farm tractor 11 in both of these figures.

The conveyor unit comprises a long inclined auger tube section 12, and a shorter or feed auger tube section 17 attached to the inlet area of the main auger 12. An outlet spout 18 of the short auger 17 feeds into an intake enclosure 19 of the main auger section 12.

The main auger 12 is supported by undercarriage frame members, 13 and 14, carried on an axle 16 with spaced wheels 15. The angle of incline and hence the position of an outlet 20 of the main auger section 12 can be adjusted by moving the top pivot of the undercarriage frame members 14 along a track 21 on the underside of the auger tube. The mechanism for controlling the positioning comprises as shown a cable 22 and winch 23 arrangement but alternative devices can be used. The lower end of the main auger 12 is attached to the tractor by the use of a hitch member 24 which is of conventional arrangement.

The auger conveyor unit is shown in full line in FIG. 1 in working position with the shorter or feed auger tube 17 extending out from the main auger 12 substantially at right angles thereto. In this position, trucks can be unloaded into a hopper section 25 at the end of the short auger most commonly by backing in along side the tractor. The hopper 25 is fitted with small wheels 26 at its free end so that it may be swung back and forth about a vertical axis passing through the connection of its spout 18 with the intake 19 for optimum positioning dependent upon ground conditions or to meet the dump position of the truck.

Figure 4:
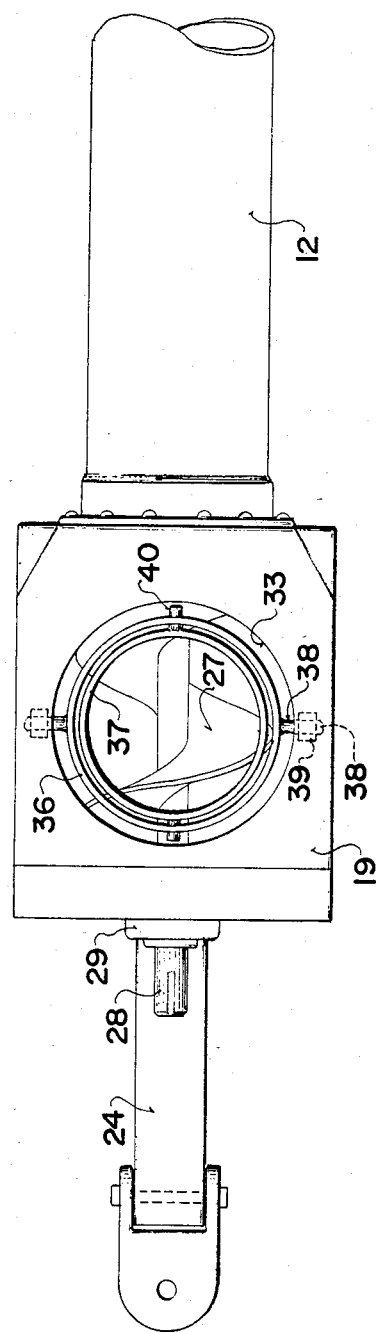
FIG. 4 is a plan view of the connection of FIG. 3 showing the main auger inlet enclosure with the feed auger section removed.

As shown in FIG. 4, the main auger 12 includes a main auger flighting 27 mounted on a flighting shaft 28 which extends through a bottom bearing 29 and is then connected to a telescopic drive shaft 30 (FIG. 2) coupled to the tractor power-take-off. The feed auger section 17 is powered by a hydraulic motor 31 mounted at its upper end and connected to the tractor hydraulics system through hoses 32.

As shown in FIG. 2 and the phantom lines in FIG. 1, the feed auger section 17 can be moved to a transport position with the short auger 17 and hopper 25 swung back toward the main auger 12. From this position it can be raised free of the ground by a cable 35 including a winch arrangement (not shown) guided by an arm 34. It is this configuration which is used to back the auger into position against a grain bin and to transport it between job sites.

Since the angle of inclination of the main auger 12, height of the hitch point 24, angle at which the feed auger 17 is swung away from the main tube section and the extent to which the hopper 25 is raised are all variable, it is necessary to have a connection between the short auger outlet spout 18 and the main auger intake enclosure 19 such that rotation is permitted about all three axes of a rectangular coordinate system. The conveyed commodity must meanwhile be free to drop through the outlet spout into the top of the intake flighting of the main auger tube.

Figure 3:
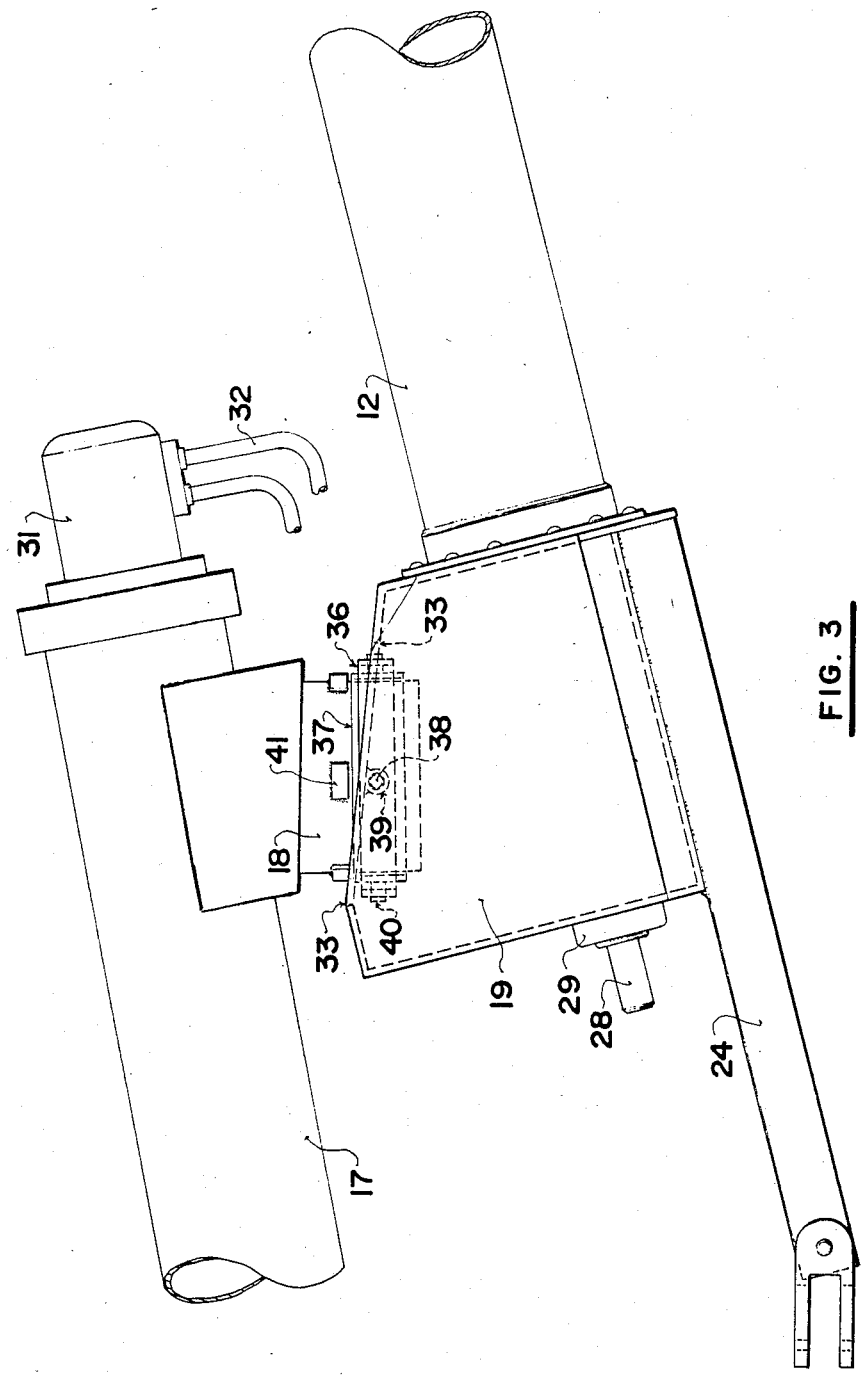
FIG. 3 is a side elevation of the connection between auger sections.

FIGS. 3 and 4 show views of a connection which allows three degrees of rotational freedom and maintains the discharge for the outlet spout 18 directly above the intake flighting 27. Specifically, a hole 33 is formed in the top of the intake enclosure 19, within which two concentric flat iron rings, 36 and 37, are positioned.

The pivot axis for the outer ring 36 is provided by two pins 38 welded to the outer circumference of the ring, which fit inside two bushings 39 welded to the top of the intake enclosure 12. The pivot axis for the inner ring is provided by two pins 40 welded to the outer circumference of the inner ring which fit freely inside two drilled holes in the outer ring.

Each of these rings 36, 37 is therefore free to rotate about an axis in the plane of the ring which runs through its center point and passes through the respective pair of pivot pins 38, 40. By having the pivot points for these rings at right angles to each other the inner ring 37 is free to rotate to any angle relative to the main auger tube 12.

The spout 18 of the feed auger 17 is constructed of round tubing such that its outer diameter is a sliding fit within the inner ring 37 thus holding the axes of the spout 18 and ring 37 substantially coincident while allowing rotation of the feed auger 17 relative to the inner ring 37 about the axes. Several welded lugs 41 arranged around the periphery of the spout 18 act to maintain proper axial location of the spout 18 relative to the ring 37. Thus the coupling or connection between the spout 18 and enclosure 19 is formed of a sleeve coupling portion defined by the outer surface of the spout and the inner side surface of the inside ring 37 together with two pivot ring portions provided by the rings 36 and 37.

The axial extent of the ring 36 is merely sufficient to receive the pins 38 and 40. The axial extent of the ring 37 is greater than that of the ring 36 because it has not only to receive the pins 40 but also to provide a sufficient axial length of sliding contact with the spout 18 to prevent undesirable twisting between the ring 37 and the spout 18 which could lead to buckling of the spout thus inhibiting the required rotational movement. The spout 18 extends through and beyond the lower extremities of the rings 36, 37 so as to avoid any such twisting movements from acting upon the edge of the spout. In addition the extent of the spout 18 beyond the rings 36,37 and into the intake enclosure 19 acts to ensure that all material supplied by the spout properly enters the intake 19 for supply to the main auger 12.

In this way, the spout 18 is free to rotate about the axis of the ring 37 by an amount limited by the mechanical contact of the auger 17 or hopper 25 with the main auger 12 or with the tractor 11. Depending upon the length of the coupling hoses 32 and other mechanical limitations therefore the feed auger 17 may be pivoted from a position adjacent one rear wheel of the tractor to a position adjacent the other rear wheel. In practice movement is usually limited to the section formed between the transport position shown in phantom and the position generally at right angles thereto extending to one side of the main auger 12.

In addition, the axis of the spout 18 is free to pivot from the generally vertical direction in any other direction, with the limitations of movement being provided by contact of the sides of the spout 18 with the edge of the opening 33 or with the outer ring 36. The spacings between the rings 36, 37 and between the outer ring 36 and the edge of the opening 33 are chosen so that a sufficient movement of the axis is provided to accommodate all practically required movments of the hopper 25. In practice such movements do not exceed 30° either side of the vertical position.

As the axis of the pins 38 and 40 are arranged mutually at right angles and the axis of rotation of the spout 18 relative to the ring 37 lies at right angles to both, it will be appreciated that the connection system thus formed provides relative pivotal movement between the spout 18 and the intake 19 about three mutually perpendicular axes while maintaining the axes fixed relative to one another. A universal coupling is thus formed which rigidly holds the spout 18 relative to the intake 19 against any lateral shifting while allowing the required rotational movement. The prevention of lateral shifting avoids any possibility of material being deposited outside the intake 19 and also prevents any possibility of the spout 18 contacting the flightings 27 of the auger 12 with resultant damage.

Figure 5:
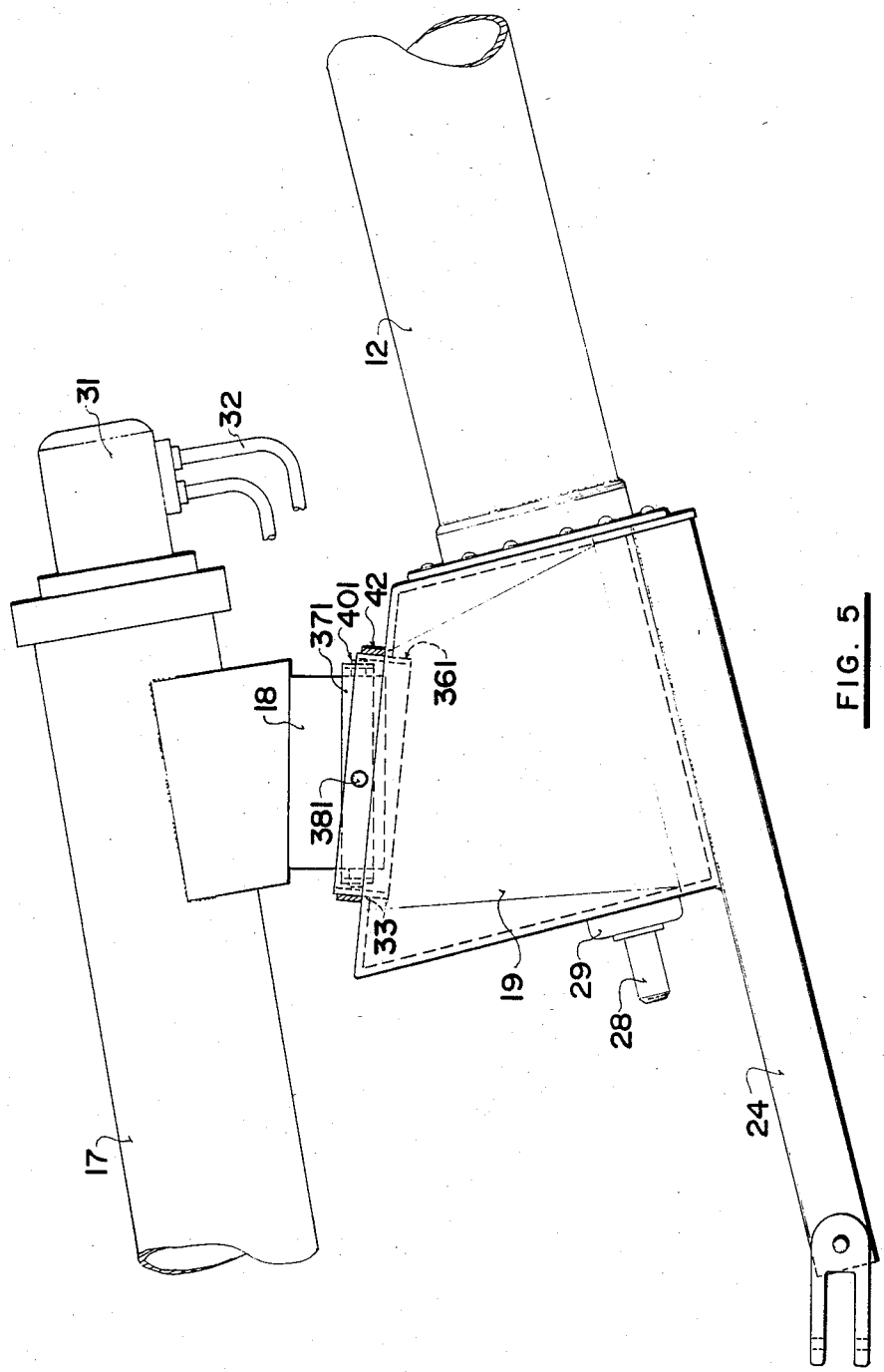
FIG. 5 is a view similar to FIG. 3 showing an alternative connection arrangement.

An alternative arrangement of the connections between the spout 18 and the intake 19 is shown in FIG. 5. In this configuration the outer ring 361 is a sliding fit within the opening 33 and carries a plurality of lugs 42 around its periphery for contacting the upper surface of the intake 19. Thus the ring 361 is allowed to rotate within the opening 33 in the top of the intake 19 and is retained against axial movement by the lugs 42, 41 and the weight of the equipment resting upon it. The inner ring 371 is mounted for pivotal movement relative to the outer ring 361 on pivot pins 381, which are fitted in drilled holes in the outer ring. The spout 18 then is mounted for pivotal movement about an axis at right angles to the pins 381 relative to the inner ring through the use of pins 401 welded on its outer circumference, which fit inside drilled holes in the inner ring 361 such that the pins 401 are placed at right angles to the pins 381.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An auger arrangement comprising a main auger including an auger tube having a feed end and a discharge end, means for supporting the auger tube at an inclination to the horizontal and to alter the elevation of the discharge end, a rotatably mounted helical auger flight within the tube for transporting particulate material within the tube from the feed end to the discharge end, the flight including an exposed portion at said feed end which projects outwardly from the tube and ground wheels for mounting said supporting means; rigid casing means substantially surrounding and enclosing the exposed portion of the flight having closed side walls and an upper wall extending directly over said exposed portion, means rigidly mounting said casing means on said tube, said upper wall defining an opening which directly overlies said exposed portion; a feed auger including an auger tube having a feed end and a discharge end and a rotatably mounted helical auger flight within the tube for transporting particulate material within the tube from the feed end to the discharge end, hopper means at the feed end of the feed auger, a downwardly depending discharge spout at the discharge end of the feed auger and coupling means for mounting said spout on said upper wall, said coupling means comprising a first sleeve coupling portion surrounding the spout which allows rotational movement of the spout relative to the upper surface about a first longitudinal of the spout, a first pivot ring coupling portion surrounding said spout and providing pivotal movement of said spout relative to said upper surface about a second axis transverse to said spout, and a second pivot ring coupling portion surrounding said spout and providing pivotal movement of said spout relative to said spout relative to said upper surface about a third axis transverse to said spout and transverse to said second axis, said coupling portions being arranged to maintain said spout against lateral shifting relative to said opening while allowing rotational movement relative thereto about said three axes, whereby said spout extends into said opening for direct unhindered discharge of material onto said exposed portion.

2. Apparatus according to claim 1 wherein the three coupling portions are arranged such that the axes lie at substantially right angles to one another.

3. Apparatus according to claim 1 wherein the first auger is movable between a stored position adjacent the second auger and a working position generally at right angles to the stored position.

4. Apparatus according to claim 1 wherein one of the augers includes means for receiving drive power from the power-take-off shaft of a tractor and the other auger includes hydraulic motor means for receiving hydraulic power from a tractor.

5. An auger arrangement comprising a main auger including an auger tube having a feed end and a discharge end, means for supporting the auger tube at an inclination to the horizontal and to alter the elevation of the discharge end, a rotatably mounted helical auger flight within the tube for transporting particulate material within the tube from the feed end to the discharge end, the flight including an exposed portion at said feed end which projects outwardly from the tube and ground wheels for mounting said supporting means; rigid casing means substantially surrounding and enclosing the exposed portion of the flight having closed side walls and an upper wall extending directly over said exposed portion, means rigidly mounting said casing means on said tube, said upper wall defining an opening which directly vertically overlies said exposed portion; a feed auger including an auger tube having a feed end and a discharge end and a rotatably mounted helical auger flight within the tube for transporting particulate material within the tube from the feed end to the discharge end, hopper means at the feed end of the feed auger, a downwardly depending discharge spout at the discharge end of the feed auger and coupling means for mounting said spout on said upper wall, said coupling means comprising a first sleeve coupling portion surrounding the spout which allows rotational movement of the spout relative to the upper surface about a first axis longitudinal of the spout, a first pivot ring coupling portion surrounding said spout and providing pivotal movement of said spout relative to said upper surface about a second axis transverse to said spout, and a second pivot ring coupling portion surrounding said spout providing pivotal movement of said spout device relative to said upper surface about a third axis transverse to said spout and transverse to said second axis, said coupling portions being arranged to maintain said spout against lateral shifting relative to said opening while allowing rotational movement relative thereto about said three axes, whereby said spout extends into said opening for direct unhindered discharge of material onto said exposed portion, said hopper means including ground engaging means spaced on respective sides of said feed auger whereby said feed auger is stably supported in a feed position by said ground engaging means and said coupling means.

6. An auger arrangement comprising a main auger including an auger tube having a feed end and a discharge end, means for supporting the auger tube at an inclination to the horizontal and to alter the elevation of the discharge end, a rotatably mounted helical auger flight within the tube for transporting particulate material within the tube from the feed end to the discharge end, the flight including an exposed portion at said feed end which projects outwardly from the tube and ground wheels said supporting means; rigid casing means substantially surrounding and enclosing the exposed portion of the flight having closed side walls and an upper wall extending over said exposed portion, means rigidly mounting said casing means on said tube, said upper wall defining an opening which directly vertically overlies said exposed portion for receiving said particulate material therethrough for flowing by graviy on to said exposed portion; a feed auger including an auger tube having a feed end and a discharge end and a rotatably mounted helical auger flight within the tube for transporting particulate material within the tube from the feed end to the discharge end, hopper means at the feed end of the feed auger, a downwardly depending discharge spout at the discharge end of the feed auger and coupling means for mounting said spout on said upper wall, said coupling means comprising a first sleeve coupling portion surrounding the spout which allows rotational movement of the spout relative to the upper surface about a first axis longitudinal of the spout, a first pivot ring coupling portion surrounding said spout and providing pivotal movement of said spout relative to said upper surface about a second axis transverse to said spout, and a second pivot ring coupling portion surrounding said spout and providing pivotal movement of said spout relative to said upper surface about a third axis transverse to said spout and transverse to said second axis, said coupling portions being arranged to maintain said spout against lateral shifting relative to said opening while allowing rotational movement relative thereto about said three axes, whereby said spout extends into said opening for direct unhindered discharge of material onto said exposed portion.

* * * * *